Figure 1:
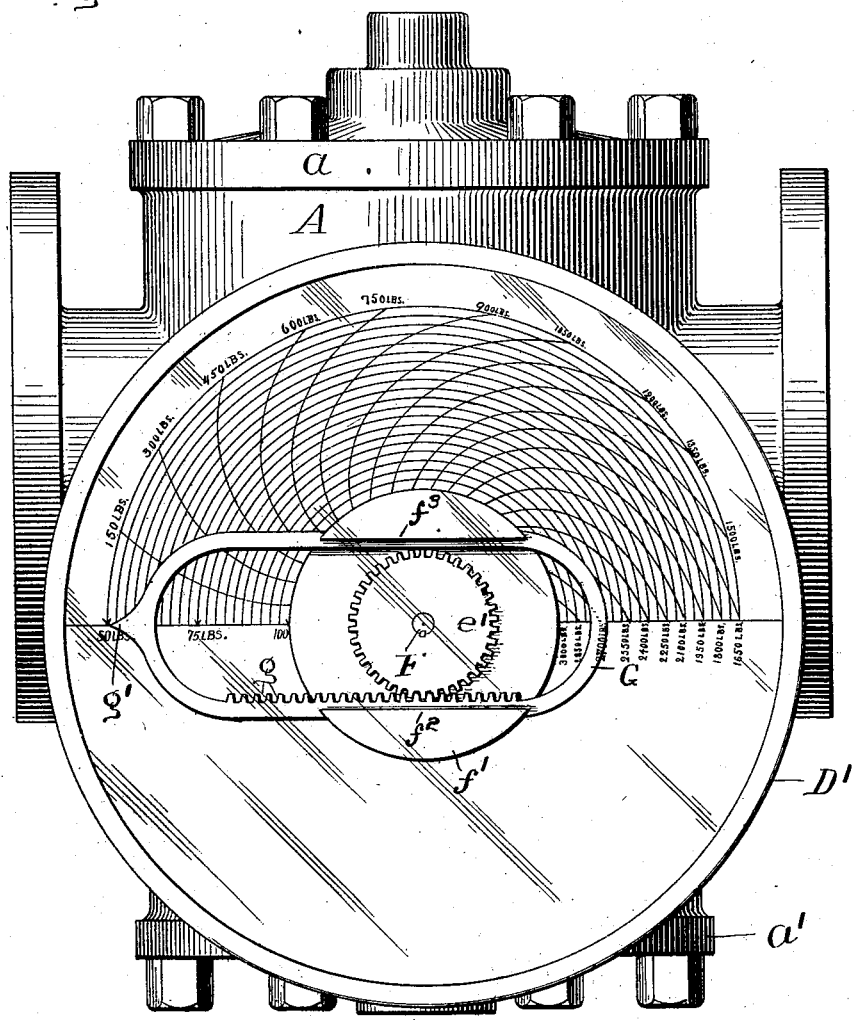

No. 729,511. PATENTED MAY 26, 1903.
C. E. SARGENT.
STEAM METER.
APPLICATION FILED MAY 28, 1902.
NO MODEL. 5 SHEETS—SHEET 1.

No. 729,511. PATENTED MAY 26, 1903.
C. E. SARGENT.
STEAM METER.
APPLICATION FILED MAY 28, 1902.
NO MODEL. 5 SHEETS—SHEET 2.

No. 729,511. PATENTED MAY 26, 1903.
C. E. SARGENT.
STEAM METER.
APPLICATION FILED MAY 28, 1902.
NO MODEL. 5 SHEETS—SHEET 3.

Witnesses:
Chas. O. Hervey
S. Bliss.

Inventor,
Charles E. Sargent
by H. Bitner,
Atty.

No. 729,511. PATENTED MAY 26, 1903.
C. E. SARGENT.
STEAM METER.
APPLICATION FILED MAY 28, 1902.
NO MODEL. 5 SHEETS—SHEET 4.

Witnesses:
Chas. J. Shervey
S. Bliss

Inventor:
Charlie E. Sargent
by H. Bitner,
Atty.

No. 729,511. PATENTED MAY 26, 1903.
C. E. SARGENT.
STEAM METER.
APPLICATION FILED MAY 28, 1902.
NO MODEL. 5 SHEETS—SHEET 5.

Witnesses: Inventor:
Chas. O. Shurvey Charles E. Sargent
S. Bliss by H. Bitner,
Atty.

No. 729,511. Patented May 26, 1903.

UNITED STATES PATENT OFFICE.

CHARLES E. SARGENT, OF CHICAGO, ILLINOIS, ASSIGNOR OF ONE-HALF TO EDWARD B. ELLICOTT, WILLIAM H. BAKER, AND JOHN I. CONNERY, OF CHICAGO, ILLINOIS.

STEAM-METER.

SPECIFICATION forming part of Letters Patent No. 729,511, dated May 26, 1903.

Application filed May 28, 1902. Serial No. 109,274. (No model.)

*To all whom it may concern:*

Be it known that I, CHARLES E. SARGENT, a citizen of the United States of America, residing at Chicago, in the county of Cook and State of Illinois, have invented certain new and useful Improvements in Steam-Meters, of which the following is a specification.

My invention relates to certain improvements in steam-meters, the object of which is to provide a device adapted, first, to maintain a predetermined ratio between the pressures upon the opposite sides of the meter; second, to indicate at all times the size of the opening through which the steam or other fluid is passing; third, to indicate at all times the actual steam-pressure upon the discharge side of the meter, and, fourth, preferably to so combine these indicating devices with a suitable dial to indicate graphically the amount of steam in pounds which happens to be passing through the meter at the time it is inspected. In connection with these various purposes it is also my intention to so construct the meter that it may be incapable of disarrangement by the passage of slugs of water through it at the great velocities induced by the passage of a large amount of steam.

To these and other ends my invention consists in certain novel features or characteristics, which are illustrated in the drawings presented herewith, of the preferred form of meter and the essential combinations and relations of the various parts thereof pointed out in the appended claims.

Figure 2:
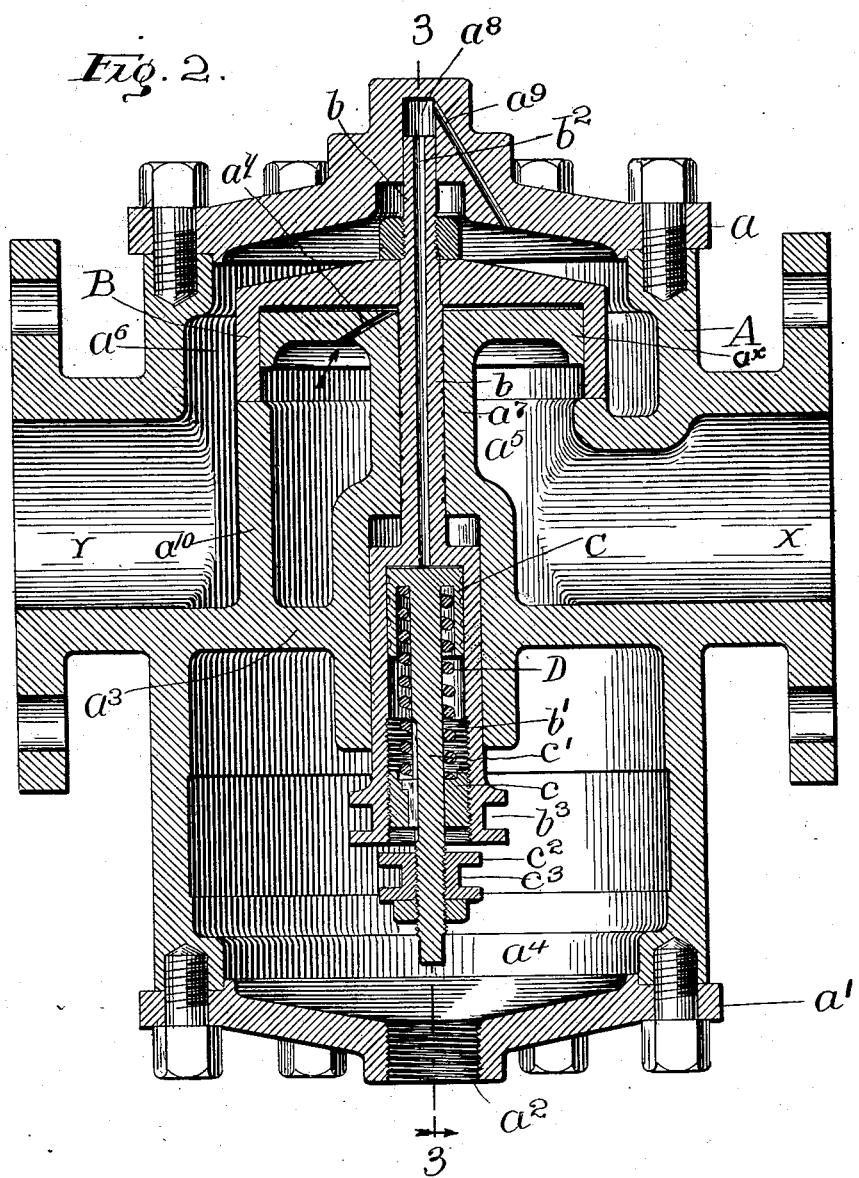
Figure 3:
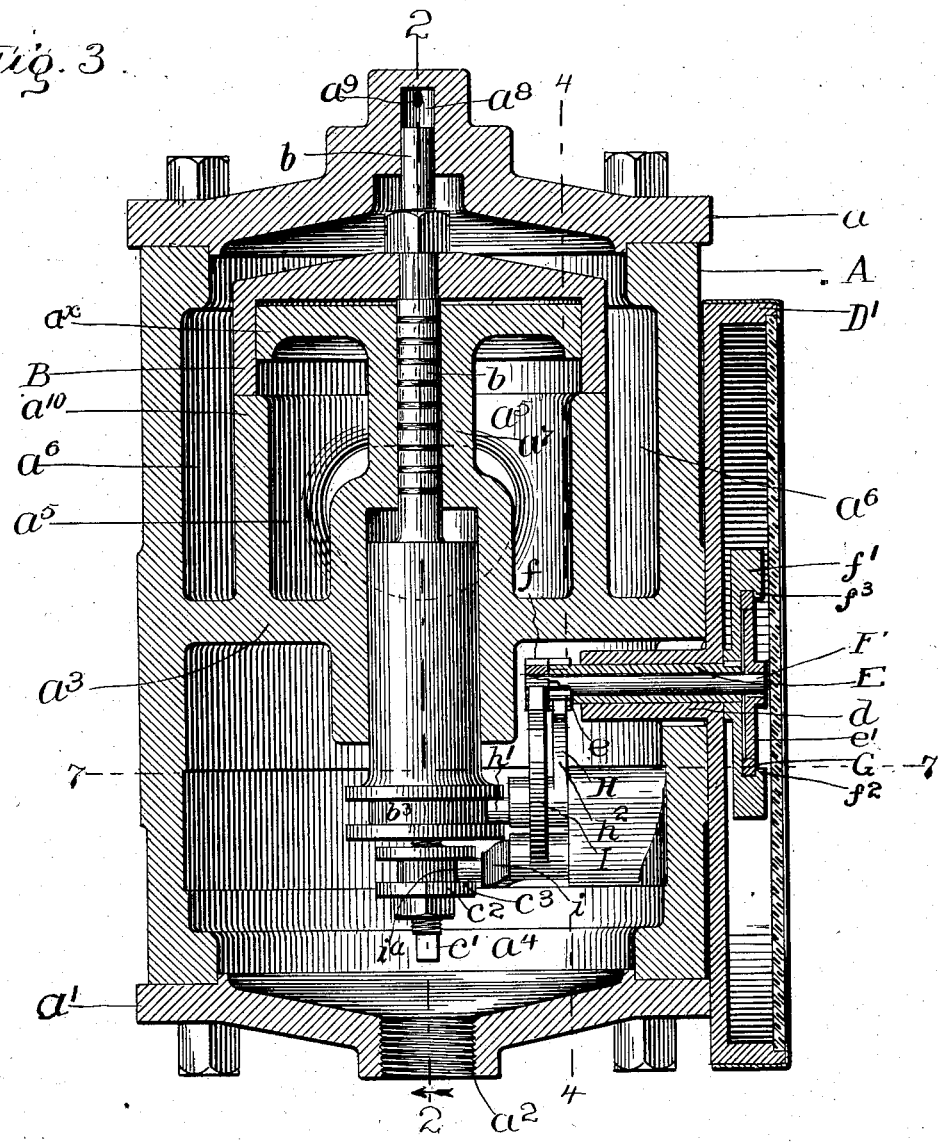
Figure 4:
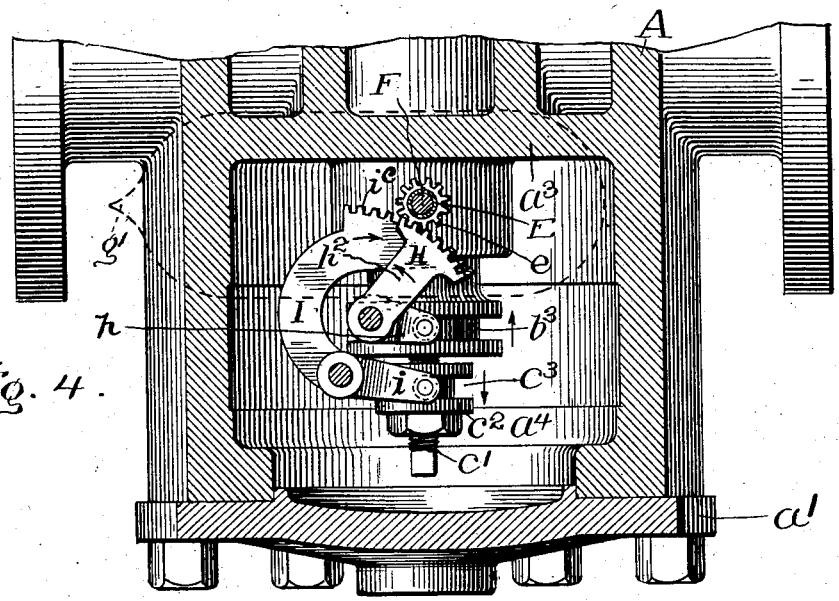
Figure 5:
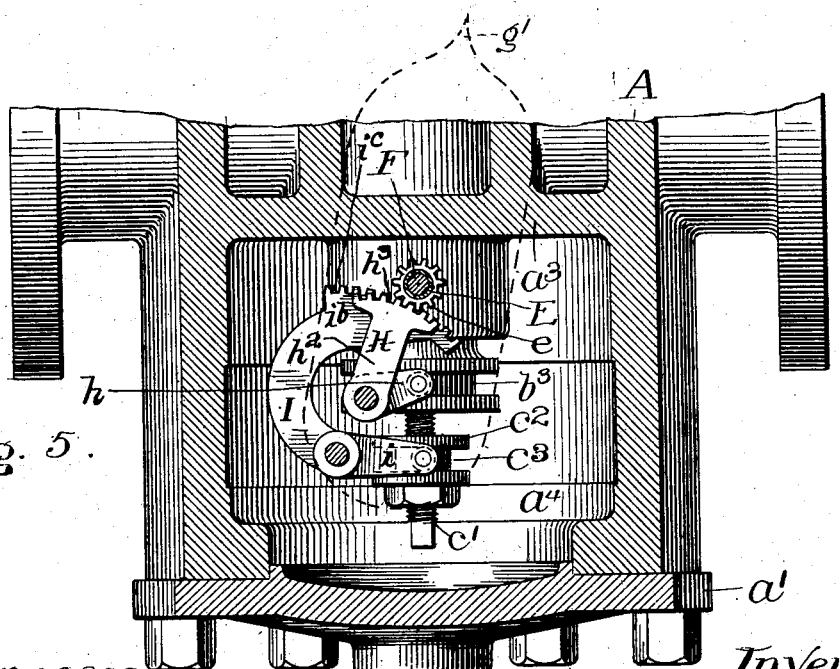
Figure 6:
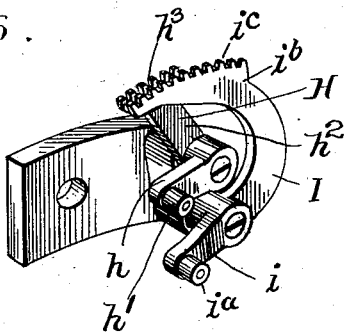
Figure 7:
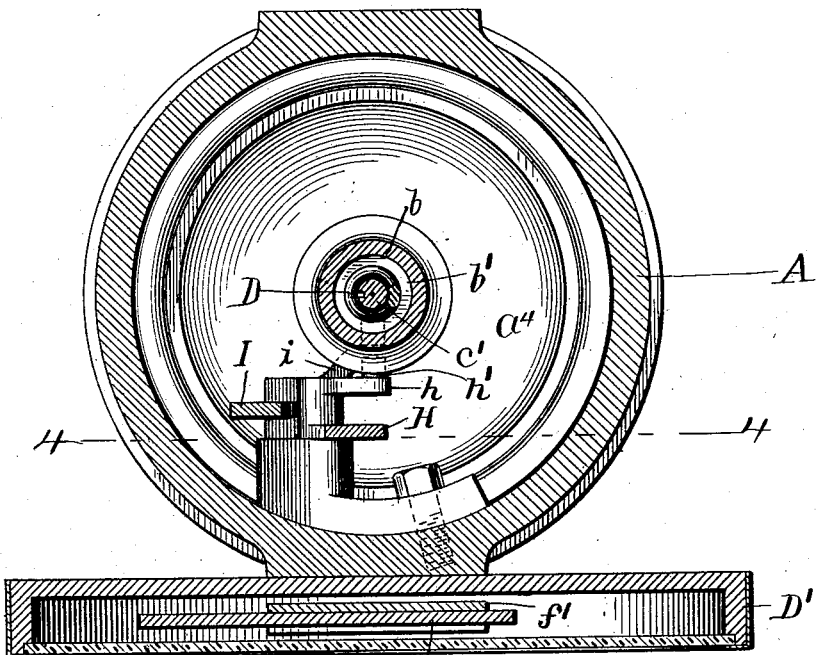

In the drawings, Figure 1 represents a front elevation of my improved meter. Fig. 2 represents a vertical longitudinal section in line 2 2 of Fig. 3. Fig. 3 represents a vertical transverse section in the line 3 3 of Fig. 2. Fig. 4 represents a section on line 4 4 of Fig. 7. Fig. 5 is a similar view showing the indicating apparatus in a different position. Fig. 6 represents a detail perspective of the bell-cranks and racks, and Fig. 7 represents a cross-section on the line 7 7 of Fig. 3.

Referring to the drawings, A is a suitable valve-casing, provided with an upward removable head $a$ and a lower removable head $a'$, the latter being perforated and tapped at $a^2$, so that it may be connected with a suitable surge tank or sewer. The body of the casing is separated by a horizontal partition $a^3$ into upper and lower portions, the lower portion $a^4$ being preferably open through the surge tank or sewer to substantially atmospheric pressure. The upper portion is further divided by a partition $a^{10}$ into a receiving-chamber $a^5$ and a discharge-chamber $a^6$. The receiving-chamber $a^5$ is open at the top, and the opening is covered by a puppet-valve B, seating upon the top of the partition $a^{10}$. The valve is guided by means of a valve-stem $b$ in a central boss $a^7$ of the casing. The upper end of the valve-stem enters a pocket $a^8$ in the head $a$, said pocket being connected by a port $a^9$ with the discharge or eduction side $a^6$ of the meter. The lower part of the central boss $a^7$ of the casing, as well as the lower portion of the valve-stem $b$, are enlarged, so that said lower portion of the valve-stem may contain a cylindrical chamber $b'$ of sufficient extent to receive a piston C, fitted to the interior of said chamber and exposed by means of a central longitudinal port $b^2$ through the upper portion of the valve-stem to whatever pressure enters the pocket $a^8$ through the port $a^9$. A nut $c$ in the lower portion of the chamber $b'$ confines a coiled spring D between itself and the piston C, a stem $c'$ extending downward from the piston through the nut and affording a connection with said cylinder. The lower portion of the valve-stem $b$ is provided with a circumferential groove $b^3$, and a nut $c^2$ is secured upon the lower end of the piston-stem and contains a similar groove $c^3$. Upon the front side of the casing is secured a dial-case D', having a central hollow boss $d$ extending into the casing, in which is journaled a sleeve E, and inside of this sleeve is journaled a shaft F. The sleeve E has upon its inner end a pinion $e$, and the shaft F has upon its inner end a pinion $f$. Within the lower part of the casing are pivoted two bell-crank levers H I. The lever H has one arm $h$, upon the end of which is a roller $h'$, running in the groove $b^3$ on the valve-stem, and a second arm $h^2$, upon the end of which is a segment $h^3$ in mesh with the pinion $e$. The lever I has an arm $i$, upon the end of which is a roller $i^a$, running in the groove $c^3$ of the nut $c^2$, and a second arm $i^b$, upon the end of which is a segment $i^c$ in mesh with the pinion $f$. Through these connections the vertical movement of the valve-stem imparts a rotary movement to the sleeve E, and a vertical movement of the piston-stem imparts a rotary movement to the shaft F. On the outer end of the sleeve is secured a disk $f'$, diametrically channeled on its outer face to receive a radial sliding pointer G, the channel being undercut upon the opposite sides to form overhanging flanges $f^2 f^3$, which secure the pointer in place upon the face of the disk. The pointer itself is preferably made in the form of an open frame, upon the lower inner side of which is a rack $g$ in mesh with a gear $e'$, secured to the outer end of the shaft F. By this connection it will be seen that the rotary movement of said shaft relative to the sleeve imparts a radial movement to the pointer, while the rotary movement of the sleeve and shaft together moves the pointer angularly about the common center of the sleeve and shaft. A pointed end $g'$ is provided on the pointer, from which the reading is to be taken. The face of the dial is ruled with concentric circles, and one of the diameters is graduated to enable the radial position of the pointer to be read regardless of its angular position upon the dial, a series of curves reaching from the inner to the outer circle are provided, and the outer circle is graduated to show the weight of steam per hour, indicated when the pointed end of the pointer stands at any point along the particular curve to which a given mark is affixed.

The induction or receiving chamber of the casing is provided with an induction-port X and the eduction or discharge chamber with an eduction-port Y, the port X being connected with the receiving steam-pipes and the port Y with the pipe leading to the engine or other point of use of the steam. The puppet-valve B is made in the form of an inverted cup, and the central boss $a^7$ is enlarged at the top into a disk $a^x$, fitted to the interior of the piston. A small port $a^y$ extends through this disk and connects the induction-chamber with the space between the top of the disk-shaped head and the valve B.

Starting with the casing empty, the valve will be found normally in the closed position because of its own gravity. If steam be turned into the induction-chamber, it will pass through the small port $a^y$ and raise the valve, carrying with it the piston inside of the valve-stem and imparting to the pointer an angular movement proportional to the extent of the opening. As soon as the valve is open the steam will rush into the eduction-chamber and from there will pass through the port $a^9$ into the pocket $a^8$ and down through the valve-stem until its pressure is exerted upon the piston C within said valve-stem. This pressure will push the piston downward to an extent dependent upon the degree of pressure, and the downward movement of the piston will impart a radial movement of the pointer, whatever its angular position proportional to the pressure of steam in the eduction-chamber of the casing—that is to say, the pointed end of the pointer will be drawn inward toward the center of the circle, following the horse-power curves, and the reading in pounds of steam passing through will be constant, irrespective of the pressure of the steam. As soon as the pressure upon the eduction side rises to a point slightly short of that on the induction side the excess of area on the eduction side of the valve afforded by the upper end of the valve-stem will cause the steam-pressure upon said eduction side to tend to close the valve and hold it in that position until the use of the steam upon the eduction side lowers the pressure on that side sufficiently to enable the inflowing steam to raise the valve and allow more steam to pass through. The ratio of the area to which pressure is applied upon the eduction side of the valve to the area under pressure on the induction side is constant. Therefore the difference in pressures between the two sides of the meter will increase as the absolute pressure increases.

It is a well-known law of steam and gases that the greater the difference in pressure between two sides of a definite opening the greater the weight which will flow through and also the greater the absolute pressure and density, the difference being constant the greater the weight of steam which will flow through a definite opening.

Now in the device herein described a constant ratio will be maintained between the induction and eduction sides. Therefore there will be an increasing difference in pressure as the absolute pressure increases, while at the same time the opening through which the steam flows will diminish, so that while the angular position of the pointer is less the radial position is greater, and the steam going through must be constant, as the end of the pointer indicates.

The device above described is constructed in the form preferred at the present time; but it is realized that great variation is possible in the parts and in their relative arrangement, and for that reason the invention is not limited to the specific construction illustrated and described.

I claim as new and desire to secure by Letters Patent—

1. In a fluid-meter, the combination with a suitable casing having a passage through it for the fluid, of a valve governing the size of said passage, a pressure-actuated device moving with said valve when the opening is changed and having an independent movement caused by variation in the pressure of the fluid, a suitable indicating device and connections between said indicating device and the valve and pressure-actuated devices, respectively, whereby said indicating device affords an indication dependent both upon the size of the opening and the pressure of the fluid passing therethrough, substantially as described.

2. In a fluid-meter, the combination with a casing having an opening through it for the fluid, and a valve controlling said opening, of a pressure-actuated device mounted on the valve and moving therewith and having independent movement with respect thereto, governed by the pressure within the valve and an indicating device connected to the valve and moving therewith and having a movement effected thereby independent of and in addition to that caused by the valve itself, substantially as described.

3. In a steam-meter, the combination with a single pointer, of suitable devices for indicating volume and pressure, said pointer being so geared to said indicating devices as to indicate, by its position, the weight of steam passing through said meter, substantially as described.

4. In a steam-meter, the combination of a device for producing a variable opening and adapted to keep a constant ratio between the pressures on the two sides of said opening regardless of absolute pressure, with a pointer actuated by said device and adapted to indicate the size of said opening, substantially as described.

5. In a steam-meter, the combination of a valve adapted to produce a variable opening, and preserve a constant ratio between the pressures on the two sides of said opening regardless of absolute pressure, of a needle so geared to said valve as to indicate the volume of steam passing through said opening, substantially as described.

6. In a steam-meter, the combination with a valve controlling the size of a variable opening and adapted to preserve a constant ratio between the pressures upon the two sides of said opening regardless of absolute pressure, a valve-stem attached to said valve and adapted to hold it in place, said valve-stem opening at its lower extremity to the atmosphere, of a pointer so geared to the lower end of said valve-stem as to indicate by its position, the volume of steam passing through said variable opening, substantially as described.

7. In a steam-meter, the combination with a valve governing the size of a variable opening, said valve having steam-pressure upon its upper and lower surfaces, said surfaces being so proportioned that said valve will maintain a constant ratio between the pressures upon the two sides of said variable opening regardless of absolute pressure, and a valve-stem opening to the atmosphere, of a pointer so geared to said valve-stem as to indicate the volume of steam passing through said variable opening, substantially as described.

8. In a steam-meter, the combination with a frame perforated for the passage of steam, of a valve closing said perforation, a valve-stem guided in a suitable perforation in said frame, said frame having two other perforations, one extending from the inlet side of said valve to its under side and one extending from the outlet side of said valve, to the upper part of said valve-stem, the areas of the lower surface of said valve and the upper surface of said valve-stem being so proportioned as to preserve a constant ratio between the pressures on the opposite sides of said meter, substantially as described.

9. In a steam-meter, the combination with a frame perforated for the passage of steam, of a valve adapted to maintain a constant ratio between the pressures on opposite sides of said perforation, a valve-stem guided in a perforation in said frame, a pressure-gage adapted to be actuated by the pressure in said meter, a suitable pointer and means of connection between said pointer and said valve and pressure-gage, whereby said pointer indicates the weight of steam passing through the meter, substantially as described.

10. In a steam-meter, the combination with a frame perforated for the passage of steam, of a valve adapted to preserve a constant ratio between the pressures upon the two sides of said perforation, a valve-stem enlarged at its lower end, connected with said valve and guided by a perforation in said frame, of a piston and compression-spring within the enlarged end of said valve-stem and a pointer so actuated by said valve-stem and said piston and spring as to indicate the weight of steam passing through said meter, substantially as described.

11. In a steam-meter, the combination with a valve-stem adapted to indicate the size of a variable steam-passage and a piston confined within said valve-stem adapted to indicate the absolute pressure, of a needle, G, provided with a rack, $g$, a pinion, $e'$, in engagement with said rack, means of connection between said pinion and said piston and means of connection between said needle and said valve-stem, whereby said needle is moved angularly by the motions of said valve-stem and radially by the motions of said piston, substantially as described.

12. In a steam-meter the combination with a volume-indicating valve-stem and a pressure-indicating piston confined within said valve-stem, of a pointer-frame, G, a sleeve connected therewith, a pinion, $e$, upon said sleeve, a bell-crank, H, a rack, $h^3$, upon said bell-crank, engaging the pinion, $e$, a roller upon said bell-crank engaged by said volume-indicating valve-stem, said pointer-frame being thereby adapted to be angularly rotated by the motion of said volume-indicating valve-stem and a needle proper adapted to move radially with said pointer-frame, G, provided with a rack, $g$, a pinion, $e'$, engaging said rack, the shaft, F, running through the sleeve, E, connected with said pinion, the pinion, $f$, upon the other end of said shaft, a bell-crank, I, a rack, $i^c$, upon one end thereof, connecting the pinion, f, a roller, i^a, connected with said bell-crank and engaged by said pressure-indicating piston, said pointer being thereby adapted to be moved radially by the motion of said pressure-indicating piston, substantially as described.

13. In a meter adapted to measure a fluid of variable pressure, the combination with a suitably-mounted indicating device capable of two independent movements in different directions, of a fluid-actuated device, the movement of which is governed by the pressure of the fluid within the meter, a second fluid-actuated device, the movement of which is proportionate to the volume of the fluid which passes through the meter, and suitable connecting devices between said fluid-actuated devices and said indicating device, whereby their respective movements may impart corresponding movements to the pointer in said two independent directions, substantially as described.

14. In a device of the class described, the combination with a pointer adapted to move radially with changes in pressure and angularly with changes in volume of the steam passing through the said device, of a dial provided with intersecting curves, whereby the position of said pointer may be read directly in weight of steam, substantially as set forth.

In witness whereof I have hereunto set my hand, at Chicago, in the county of Cook and State of Illinois, this 28th day of April, A. D. 1902.

CHARLES E. SARGENT.

Witnesses:
CHARLES O. SHERVEY,
S. BLISS.